United States Patent
Wada

(10) Patent No.: US 10,134,118 B2
(45) Date of Patent: Nov. 20, 2018

(54) INFORMATION PROCESSING APPARATUS AND METHOD OF OBTAINING INFORMATION ABOUT A PROJECTION SURFACE ON WHICH A TARGET IS PROJECTED

(71) Applicant: CANON KABUSHIKI KAISHA, Tokyo (JP)

(72) Inventor: Asuka Wada, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 44 days.

(21) Appl. No.: 14/491,311

(22) Filed: Sep. 19, 2014

(65) Prior Publication Data
US 2015/0084992 A1    Mar. 26, 2015

(30) Foreign Application Priority Data

Sep. 26, 2013   (JP) .................... 2013-200525

(51) Int. Cl.
*G06T 3/20*        (2006.01)
*G06T 5/00*        (2006.01)
(Continued)

(52) U.S. Cl.
CPC ............ *G06T 5/006* (2013.01); *G06K 9/3233* (2013.01); *G06T 3/20* (2013.01); *G06T 7/80* (2017.01);
(Continued)

(58) Field of Classification Search
CPC ..... G06K 2009/3225; G06K 2009/363; G06K 9/00523; G06K 9/3233; G06T 5/006;
(Continued)

(56) References Cited

U.S. PATENT DOCUMENTS 6,715,888 B1 * 4/2004 Raskar .................. G03B 21/00
    348/E9.027
7,268,803 B1 * 9/2007 Murata ................. G06T 3/4038
    348/218.1
(Continued)

FOREIGN PATENT DOCUMENTS

CN    101006720 A    7/2007
CN    101136192 A    3/2008
(Continued)

OTHER PUBLICATIONS

European Search Report issued in corresponding application No. 14003236.8 dated Mar. 2, 2015.
(Continued)

*Primary Examiner* — Jin-Cheng Wang
(74) *Attorney, Agent, or Firm* — Carter, DeLuca, Farrell & Schmidt, LLP

(57) ABSTRACT

An information processing apparatus includes an acquisition unit configured to acquire information about a projection surface on which a projection unit projects a target image, a storage unit configured to store first information indicating a first position, on the projection surface, of the target image projected on the projection surface by the projection unit in a first projection state, and a control unit configured to control a position, on the projection surface, of the target image to move from a second position on the projection surface where the target image is projected by the projection unit in a second projection state to the first position on the projection surface.

16 Claims, 13 Drawing Sheets

(51) Int. Cl.
*G06T 7/80* (2017.01)
*G06K 9/32* (2006.01)
*H04N 9/31* (2006.01)
*G03B 21/14* (2006.01)
*G06K 9/36* (2006.01)

(52) U.S. Cl.
CPC ......... *H04N 9/3185* (2013.01); *H04N 9/3194* (2013.01); *G03B 21/147* (2013.01); *G06K 2009/3225* (2013.01); *G06K 2009/363* (2013.01); *H04N 9/3147* (2013.01)

(58) Field of Classification Search
CPC ...... G06T 3/20; H04N 9/3185; H04N 9/3197; H04N 5/74
USPC ........................................ 345/647; 348/333.1
See application file for complete search history.

(56) References Cited

U.S. PATENT DOCUMENTS

| | | | | |
|---|---|---|---|---|
| 9,128,366 | B2* | 9/2015 | Oda | G03B 21/53 |
| 2002/0164083 | A1* | 11/2002 | Song | H04N 3/2335 |
| | | | | 382/275 |
| 2004/0155965 | A1* | 8/2004 | Jaynes | H04N 5/74 |
| | | | | 348/189 |
| 2008/0062164 | A1* | 3/2008 | Bassi | H04N 9/3147 |
| | | | | 345/214 |
| 2009/0115916 | A1* | 5/2009 | Kondo | H04N 5/74 |
| | | | | 348/745 |
| 2010/0061659 | A1* | 3/2010 | Slack | G06K 9/3216 |
| | | | | 382/295 |
| 2010/0165168 | A1* | 7/2010 | Takahashi | H04N 9/3182 |
| | | | | 348/333.1 |
| 2010/0182457 | A1* | 7/2010 | Furui | H04N 9/3194 |
| | | | | 348/231.7 |
| 2010/0315825 | A1* | 12/2010 | Kawamura | H04N 9/3185 |
| | | | | 362/458 |
| 2011/0169777 | A1* | 7/2011 | Ouchi | G06T 7/001 |
| | | | | 345/175 |
| 2012/0013634 | A1* | 1/2012 | Haraguchi | H04N 9/3194 |
| | | | | 345/589 |
| 2012/0212627 | A1* | 8/2012 | Klose | H04N 9/3182 |
| | | | | 348/189 |
| 2013/0113975 | A1* | 5/2013 | Gabris | G03B 17/54 |
| | | | | 348/333.1 |
| 2014/0292817 | A1* | 10/2014 | Iversen | G03B 17/54 |
| | | | | 345/672 |
| 2015/0015853 | A1* | 1/2015 | Nakashin | H04N 9/3185 |
| | | | | 353/85 |
| 2015/0042964 | A1* | 2/2015 | Furui | G03B 21/53 |
| | | | | 353/69 |
| 2015/0103257 | A1* | 4/2015 | Nakashin | H04N 9/3194 |
| | | | | 348/746 |

FOREIGN PATENT DOCUMENTS

| | | |
|---|---|---|
| CN | 103309141 A | 9/2013 |
| JP | 11-327042 A | 11/1999 |
| JP | 2009-135921 A | 6/2009 |
| WO | 2007/149323 A2 | 12/2007 |

OTHER PUBLICATIONS

Gupta et al., "Active Pursuit Tracking in a Projector-Camera System with Application to Augmented Reality", Proceedings of the 2005 IEEE Computer Society Conference on Computer Vision and Pattern Recognition (CVPR'05), pp. 1-8, 2005.

Chinese Office Action issued in corresponding application No. 201410497144.2 dated Mar. 30, 3017.

Office Action issued in corresponding Japanese application No. 2013200525 dated Jul. 28, 2017.

* cited by examiner

FIG. 8

| FEATURE POINT OF PROJECTION REGION IN FIRST PROJECTION REGION INFORMATION | COORDINATES (x:y) |
|---|---|
| A | (392:280) |
| B | (1512:280) |
| C | (392:924) |
| D | (1512:924) |

FIG. 9

| FEATURE POINT OF PROJECTION REGION IN FIRST PROJECTION REGION INFORMATION | COORDINATES (x:y) |
|---|---|
| A | (224:168) |
| B | (767:252) |
| C | (1305:252) |
| D | (1680:168) |
| ⋮ | ⋮ |
| H | (1680:896) |

F I G. 10
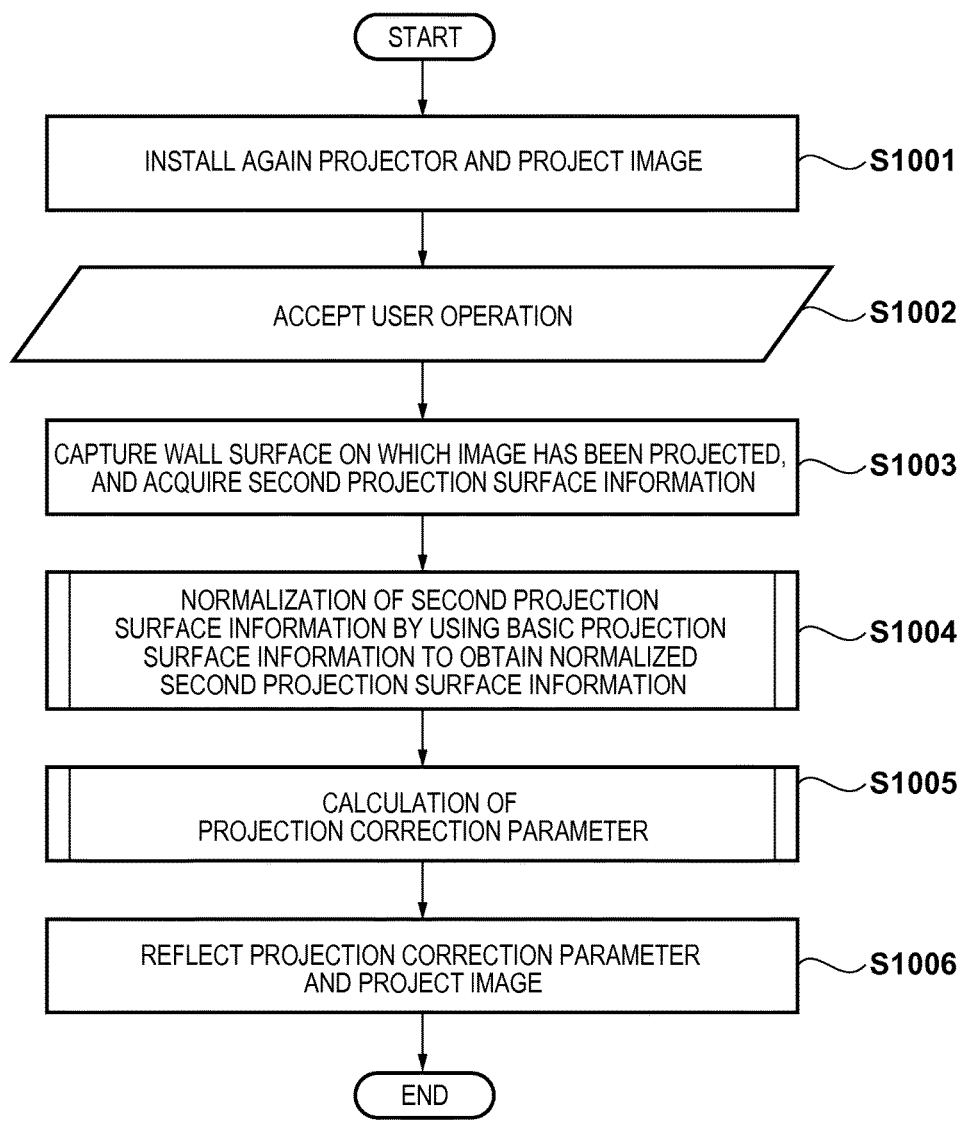

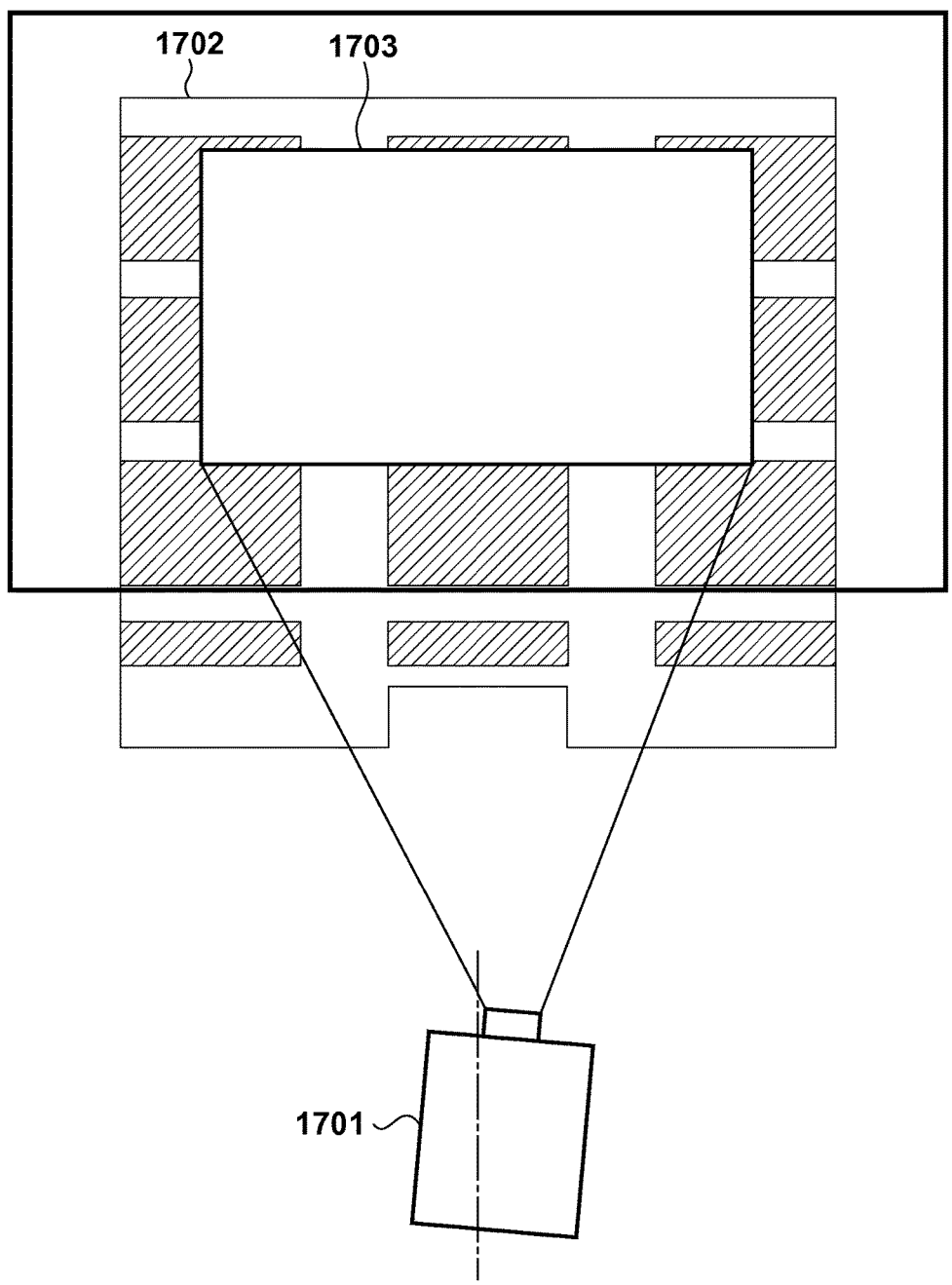
F I G. 17

INFORMATION PROCESSING APPARATUS AND METHOD OF OBTAINING INFORMATION ABOUT A PROJECTION SURFACE ON WHICH A TARGET IS PROJECTED

BACKGROUND

Field of the Embodiments

Embodiments described herein relate generally to an information processing apparatus and a method of controlling information processing apparatus of controlling display of an image to be projected by a projection unit.

Description of the Related Art

Recently, the definition and brightness of projectors are increasing, and applications of the projectors have diversified. For example, in projection mapping in which a projector projects an image in accordance with the shape of the wall surface of a building, an object, or the like, an image needs to be projected at high accuracy of the projection position with respect to a relatively distant projection surface. Even in a multi-projection system in which a plurality of projectors cooperate with each other to project a seamless image, the projection position needs to be accurate in order to prevent a shift or blur of a region where images come close or overlap each other.

As a result of the improvement of portability along with downsizing and weight reduction of projectors, it is becoming popular to install a projector only when used. For example, it is predicted to install a projector over a weekend and project an image even in a use case in which, conventionally, a projector has not been moved once installed, as in the above-mentioned projection mapping.

Alignment of the projection region of a projector is cumbersome. Especially when the projection surface is distant, a small change of the projector installation position greatly influences a projection position and shape on the projection surface. Thus, the alignment takes time every time the projector is installed. The alignment is also troublesome even at the time of projection in a general meeting room, and it is requested to shorten the projector installation time.

Japanese Patent Laid-Open No. 11-327042 has disclosed a method of automatically adjusting an installation position while confirming a marker on a screen, and the position of the bright point of a laser pointer that is emitted by a projector.

However, the method described in Japanese Patent Laid-Open No. 11-327042 requires a specific projection surface (for example, screen) on which the marker is set in advance. In addition, the projection position and size with respect to the projection surface are determined in advance. Therefore, the request to project an image at high accuracy of the projection position on an arbitrary projection surface, as in projection mapping, cannot be satisfied by this method.

SUMMARY

Embodiments described herein provide a technique capable of easily projecting a target image from a projection apparatus on an arbitrary projection surface in the same state as a past projection state.

An information processing apparatus according to the embodiments comprises the following arrangement. That is, an information processing apparatus comprising: an acquisition unit configured to acquire information about a projection surface on which a projection unit projects a target image; a storage unit configured to store first information indicating a first position, on the projection surface, of the target image projected on the projection surface by the projection unit in a first projection state; and a control unit configured to control the projection unit based on the first information stored in the storage unit, acquired information about the projection surface on which the target image is projected by the projection unit in the first projection state, and acquired second information about the projection surface on which the target image is projected by the projection unit in a second projection state, and to control to move a position, on the projection surface, of the target image from a second position on the projection surface where the target image is projected by the projection unit in the second projection state to the first position on the projection surface.

A method of controlling an information processing apparatus, comprising: a storage step of causing a storage unit to store first information indicating a first position, on a projection surface, of a target image projected on the projection surface by a projection unit in a first projection state; an acquisition step of causing an acquisition unit to acquire information about the projection surface; and a control step of controlling the projection unit based on the first information stored in the storage unit, acquired information about the projection surface on which the target image is projected by the projection unit in the first projection state, and acquired second information about the projection surface on which the target image is projected by the projection unit in a second projection state, and controlling to move a position, on the projection surface, of the target image from a second position on the projection surface where the target image is projected by the projection unit in the second projection state to the first position on the projection surface.

Further features will become apparent from the following description of exemplary embodiments (with reference to the attached drawings).

BRIEF DESCRIPTION OF THE DRAWINGS

FIG. 8 is a table showing an example of a method of storing the detection result of the feature point group of the projection region according to the first embodiment;

FIG. 9 is a table showing an example of a method of storing the detection result of the feature point group of the wall surface according to the first embodiment;

FIG. 10 is a flowchart showing processing of correcting and projecting the second projection region according to the first embodiment;

FIG. 17 is a view showing an example of a projection state reflecting the projection correction parameter according to the first embodiment.

DESCRIPTION OF THE EMBODIMENTS

Embodiments of the present invention will now be described in detail with reference to the accompanying drawings.

<First Embodiment>

Figure 1:
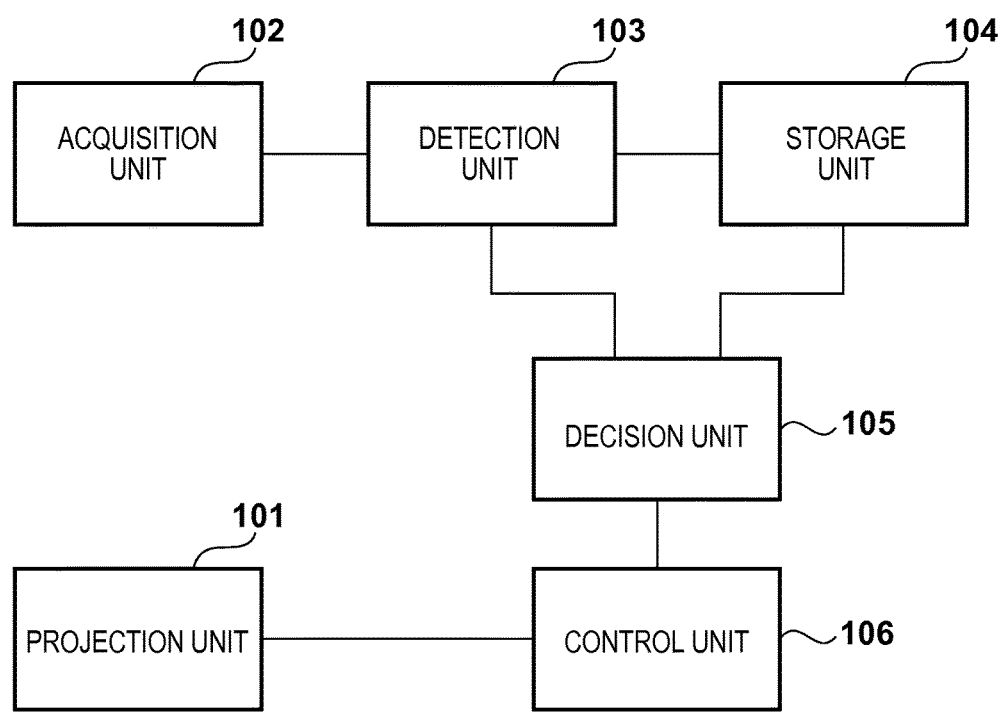
FIG. 1 is a block diagram showing the arrangement of a projector projection system.

FIG. 1 is a block diagram showing the arrangement of an embodiment of a projector projection system according to the first embodiment.

In FIG. 1, a projection unit 101 enlarges and projects, on a screen or wall surface in front of a projector, an arbitrary image input to the projector serving as a projection apparatus. As the projection method, for example, a liquid crystal panel transmits light to project an image, or an image displayed on a CRT is enlarged and projected using an optical system. However, the first embodiment does not limit these projection methods.

An acquisition unit 102 acquires projection surface information of a projection surface on which the projection unit 101 projects a target image. An example of the projection surface information assumes a target image, and an image obtained by capturing, by a camera, a wall surface on which an image is projected. A case in which an image captured by a camera serving as a capturing apparatus is acquired as the projection surface information will be exemplified. In this embodiment, the acquisition unit 102 acquires a captured image captured from a capturing position corresponding to a projection state of the projection unit 101. The projection state corresponds, for example, a place where the projection unit 101 is set, or projection direction of the projection unit 101.

A detection unit 103 detects projection region information from projection surface information acquired by the acquisition unit 102. An example of the projection region information assumes projection surface information, and position information of a feature point group obtained by analyzing an image captured by the camera.

A storage unit 104 stores projection region information detected by the detection unit 103. The projection region information is information indicating the position, on the projection surface, of a target image projected on the projection surface from the first position by the projection unit 101. The timing to store projection region information may be designated by the user by operating an input unit such as the button of the projector or a remote control accessory to the projector. Alternatively, projection region information may be stored automatically in synchronism with state transition of the projector such as the lapse of a predetermined time after the start of projection. In the following description, the user designates the timing to store projection region information.

A decision unit 105 decides a projection correction parameter for correcting, based on projection region information detected by the detection unit 103 and projection region information already stored in the storage unit 104, an image to be projected from the projection unit 101. The projection correction parameter assumes at least one of various forms synchronized with projector functions, such as deformation information (shape), display position information, scaling information (size), and keystone correction information.

A control unit 106 performs control for reflecting a projection correction parameter decided by the decision unit 105 in an image to be projected on the projection unit 101. The reflection form assumes various forms synchronized with projector functions, such as deformation, offset, scaling, and optical correction of an electrical image. The control unit 106 performs such control that the position, on the projection surface, of a target image to be projected on the projection surface from the second position by the projection unit 101 becomes a position corresponding to projection region information (first information).

The control unit 106 controls the projection unit 101 based on projection region information stored in the storage unit 104, information about the projection surface acquired at a position corresponding to the first position, and information about the projection surface acquired at a position corresponding to the second position.

The information about the projection surface is, for example, information of a feature point on the projection surface that is detected from an image obtained by capturing the projection surface.

Note that the projector projection system implemented as one of information processing apparatuses includes standard building components (for example, CPU, RAM, ROM, hard disk, external storage device, network interface, display, keyboard, and mouse) which are mounted in a general-purpose computer. These building components implement various functional arrangements shown in FIG. 1. These functional arrangements can also be implemented by, for example, reading out a program stored in a memory such as the ROM and executing it by the CPU.

Figure 2:
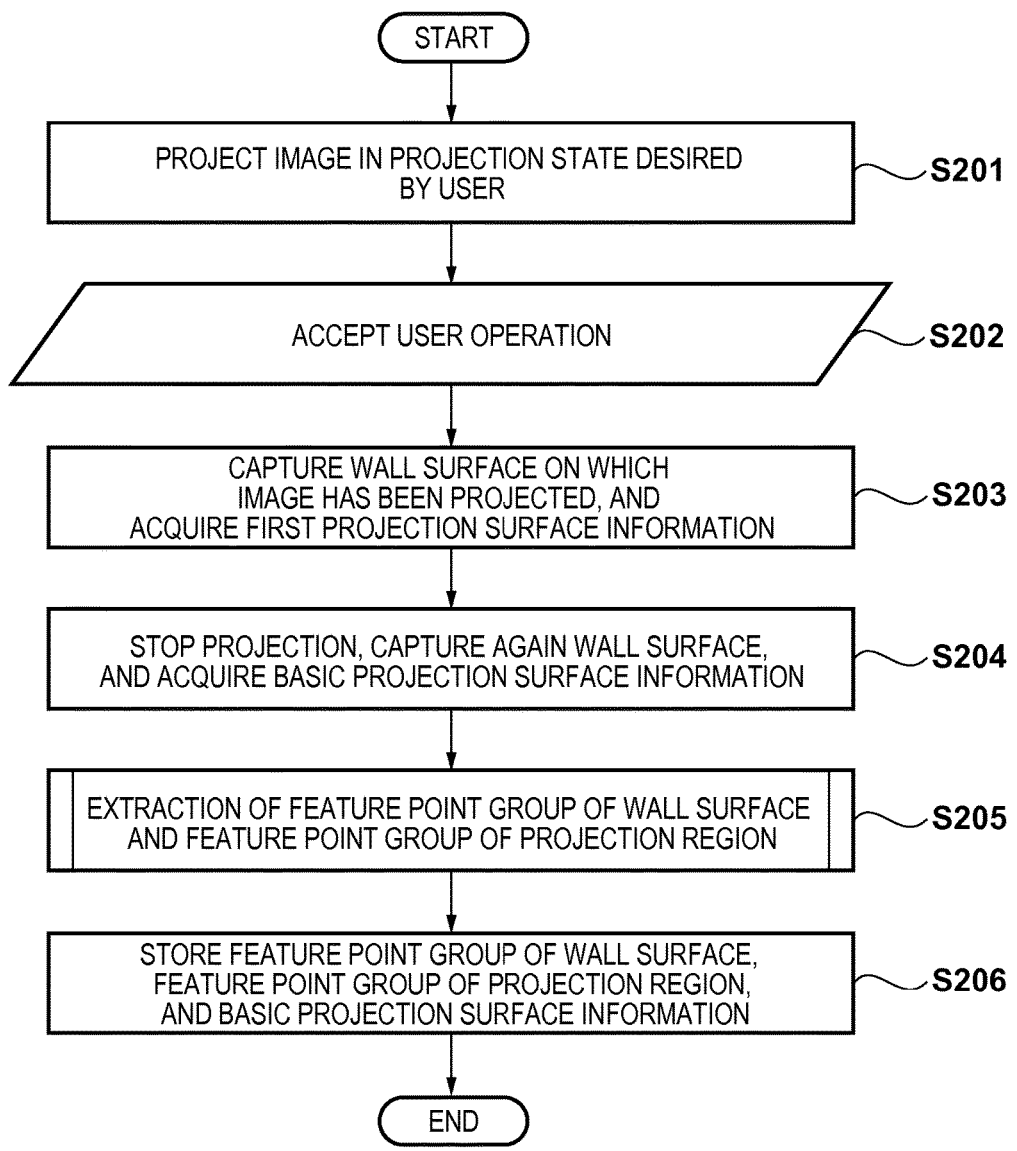
FIG. 2 is a flowchart showing processing of storing the first projection region information according to the first embodiment.

FIG. 2 is a flowchart showing processing of storing the first projection region information according to the first embodiment. This processing concerns processing when the user projects an image on an arbitrary wall surface for the first time. This processing will be explained according to the flowchart together with an example in FIGS. 3 and 4.

Figure 3:
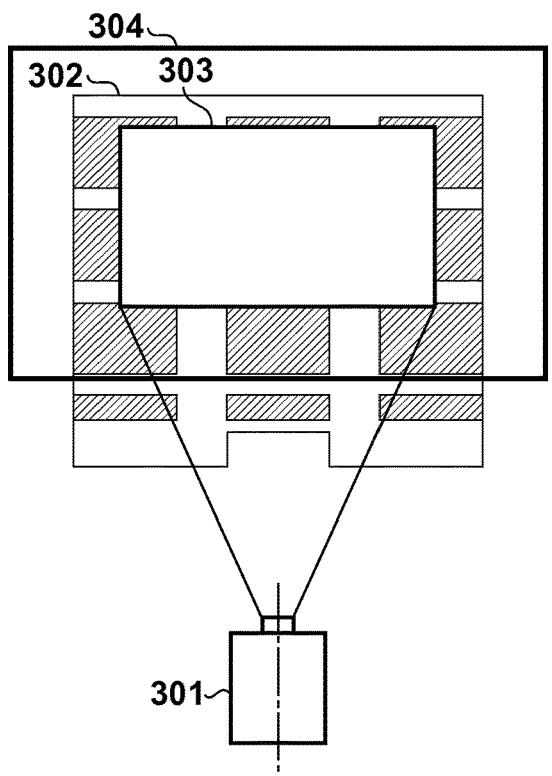
FIG. 3 is a view showing an example of the first projection state according to the first embodiment.

In step S201, the user projects an image in a desired projection state (projection position and target image size) of the projector by using the projection unit 101. This projection state will be referred to as the first projection state. FIG. 3 shows an example of the first projection state. In FIG. 3, reference numeral 301 denotes a projector; 302, a wall surface of a building on which an image from the projector 301 is projected; and 303, a projection region of the image from the projector 301. The user performs alignment of the projection region 303 while adjusting the installation position of the projector 301 or using the projection position adjustment function of the projector 301. At this time, the position of the projection region 303 is adjusted with respect to the shape or design of the wall surface 302, implementing a projection state the user wants.

In step S202, a user operation notifying that the projection unit 101 has projected the image in a projection state the user wants is accepted. The user operation is accepted through, for example, an operation to an input unit such as the button of the projector or a remote control accessory to the projector. However, the embodiment does not limit these input units. It is also possible to omit step S202 by, for example, automatically generating a notification equivalent to the user operation within the projector. The method of automatically generating a notification within the projector is, for example, a method of synchronizing with state transition of the projector a predetermined time after the start of projection.

In step S203, the acquisition unit 102 captures the wall surface on which the projection unit 101 has projected the image, and acquires the captured projection surface as the first projection surface information. In the example of FIG. 3, the acquisition unit 102 captures a region 304 including the projection region 303 and peripheral wall surface 302, and acquires the captured projection surface as the first projection surface information. The first projection surface information corresponds to the first image obtained by capturing, from a position corresponding to the first position, the projection surface on which the target image has been projected.

Figure 4:
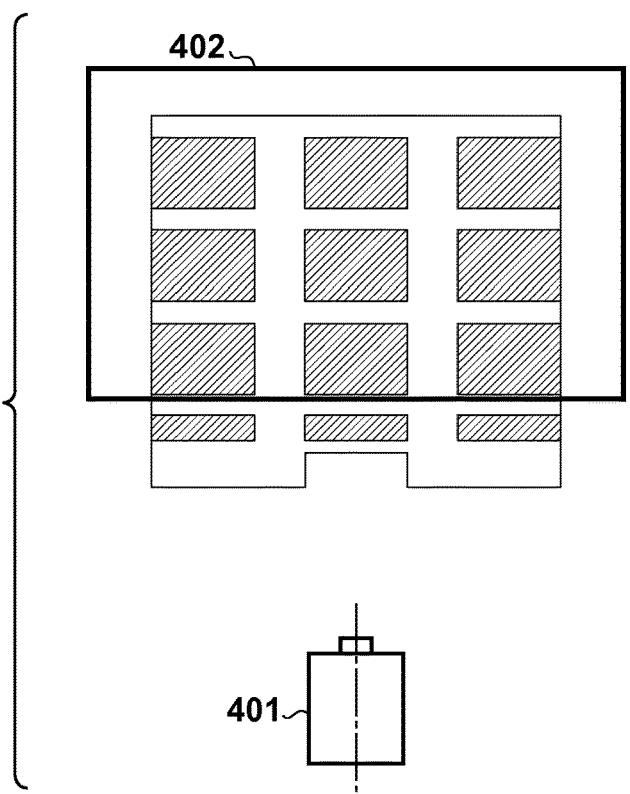
FIG. 4 is a view showing an example of a state in which the projection is stopped according to the first embodiment.

In step S204, the projection is temporarily stopped, and the acquisition unit 102 captures again the wall surface and acquires the captured projection surface as basic projection surface information. FIG. 4 is a schematic view showing a state in which the projection is stopped. Since the projection from a projector 401 is stopped, only the wall surface serving as the projection destination is captured. As a region 402 captured at this time, the same region as the region 304 captured in step S203 can be captured. However, even when the regions 304 and 402 shift from each other, the following processing can be continued by, for example, executing correction processing of normalizing the acquired first projection surface information and basic projection surface information.

In step S205, the detection unit 103 detects the feature point group of the wall surface and the feature point group of the projection region. Details of this processing will be described later with reference to FIG. 5.

In step S206, the storage unit 104 stores the feature point group of the wall surface, the feature point group of the projection region, the first projection surface information, and the basic projection surface information.

Figure 5:
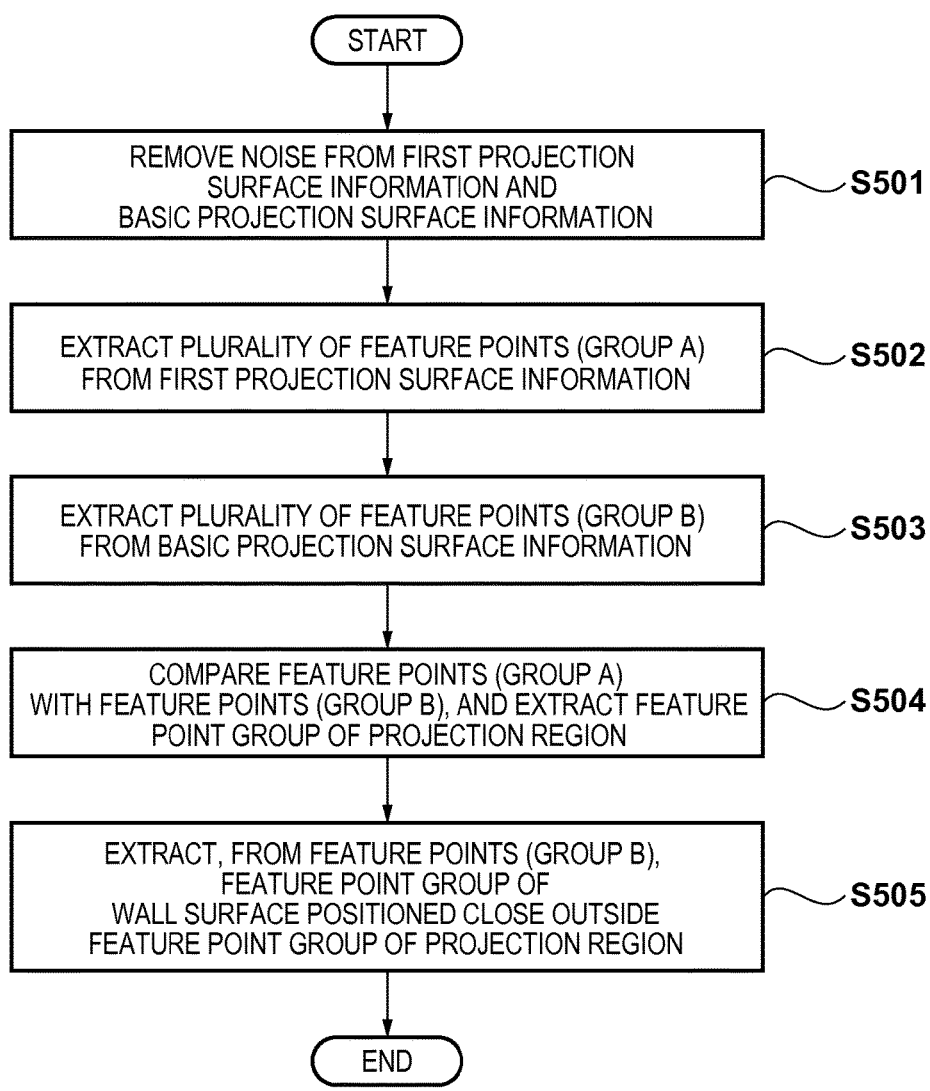
FIG. 5 is a flowchart showing details of processing of detecting the feature point group of a wall surface and the feature point group of a projection region according to the first embodiment.

FIG. 5 is a flowchart showing details of the processing of detecting the feature point group of the wall surface and the feature point group of the projection region according to the first embodiment. This processing corresponds to step S205 of FIG. 2. This processing will be explained according to the flowchart together with an example in FIGS. 6 to 9.

In step S501, the detection unit 103 removes noise from the first projection surface information and basic projection surface information. This step is pre-processing for improving the processing accuracy in subsequent steps S502 and S503, and can be omitted in accordance with the capturing states of the first projection surface information and basic projection surface information.

As the noise removal algorithm, for example, a method of applying a median filter to each pixel of the entire image is widely known. However, the embodiment does not limit the noise removal algorithm. However, to improve the accuracy of processes in step S502 and subsequent steps, an algorithm which does not impair an abrupt change point (to be referred to as an edge hereinafter) of the density in an image can be selected. Also, the same algorithm is applicable to the first projection surface information and basic projection surface information. Note that the median filter is a filter which outputs the median of pixel values in a given region. This filter has an effect of removing noise without impairing the edge.

In step S502, the detection unit 103 detects a plurality of feature points (group A) from the first projection surface information. As the feature point detection algorithm, a method of emphasizing an edge by applying a Laplacian filter to each pixel of the entire image, a KLT method, and the like are widely known. However, the embodiment does not limit the detection algorithm. Note that expression (1) represents an example of the Laplacian filter:

$$\begin{bmatrix} 0 & 1 & 0 \\ 1 & -4 & 1 \\ 0 & 1 & 0 \end{bmatrix} \quad (1)$$

Figure 6:
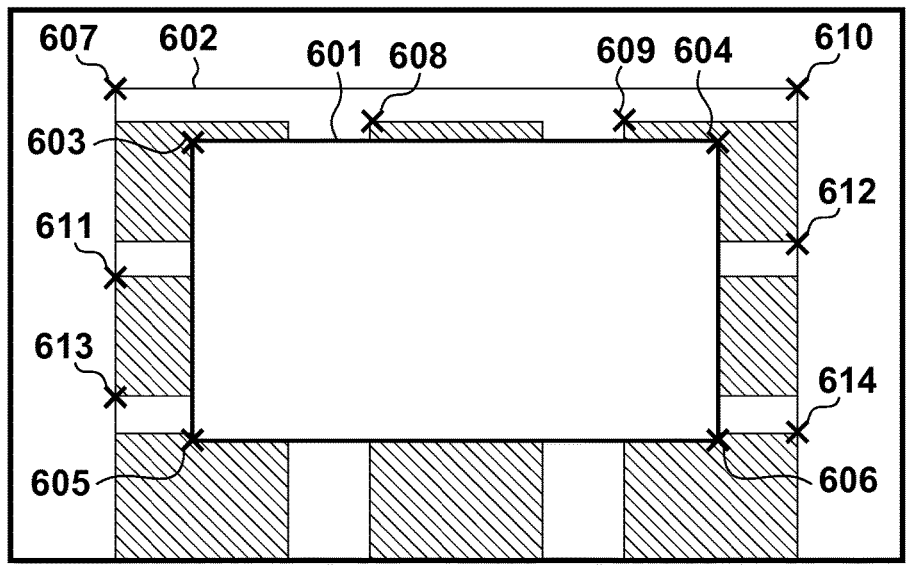
FIG. 6 is a view showing an example of the detection result of the feature point group of the projection region according to the first embodiment.

FIG. 6 shows an example of the result of detecting feature points from the first projection surface information. The first projection surface information is acquired in step S203, and is equivalent to the region 304 shown in FIG. 3. In FIG. 6, reference numeral 601 denotes a projection region; and 602, a wall surface. Feature points 603 to 614 surrounding the projection region 601 and wall surface 602 are detected.

Figure 7:
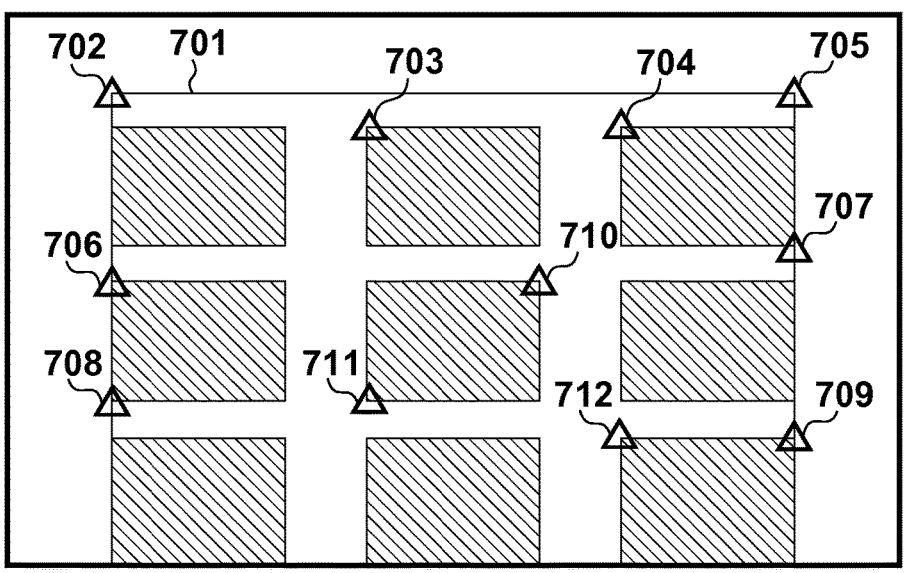
FIG. 7 is a view showing an example of the detection result of the feature point group of the wall surface according to the first embodiment.

In step S503, the detection unit 103 detects a plurality of feature points (group B) from the basic projection surface information. The detection algorithm and parameter used here are the same as those applied to the first projection surface information in step S502. FIG. 7 shows an example of the result of detecting feature points from the basic projection surface information. The basic projection surface information is acquired in step S204, and is equivalent to the region 402 shown in FIG. 4. In FIG. 7, reference numeral 701 denotes a wall surface; and 702 to 712, detected feature points of the wall surface.

In step S504, the detection unit 103 compares the feature points (group A) with the feature points (group B) to detect the feature point group of the projection region. More specifically, feature points which do not exist in the feature points (group B) are extracted from the feature points (group A), and an estimated contour is applied to the projection region, thereby detecting the feature point group of the projection region. In the example of FIGS. 6 and 7, the feature points 603 to 606 for the projection region 601 are detected. Information detected in step S504 is information indicating the position, on the projection surface, of a target image projected on the projection surface by the projection unit 101.

FIG. 8 shows an example of a method of storing, in the storage unit 104, the detection result of the feature point group of the projection region that has been detected in step S504. A table 800 has rows by the number of detected feature points of the projection region. Coordinates (x:y) serving as position information of each feature point based on, as the origin, the upper left portion of the first projection surface information are stored in a column 801. For example, a row 802 corresponds to the feature point 603 of the projection region 601 in FIG. 6.

In step S505, the detection unit 103 detects, from the feature points (group B), a feature point group of the wall surface that is positioned close outside the feature point group of the projection region. More specifically, the projection region is estimated from the feature point group of the projection region that has been detected in step S504 and is stored in the form shown in FIG. 8. Then, feature points positioned outside the projection region, that is, feature points of the wall surface outside the projection region are detected. In the example of FIGS. 6 and 7, the feature points 702 to 709 for the wall surface 701 are detected. Note that the feature points 710 to 712 are determined to fall within the projection region, and are excluded.

FIG. 9 shows an example of a method of storing, in the storage unit 104, the detection result of the feature point group of the wall surface that has been detected in step S505. A table 900 has rows by the number of detected feature points of the wall surface. The coordinates (x:y) of each feature point based on, as the origin, the upper left portion of the basic projection surface information are stored in a column 901. For example, a row 902 corresponds to the feature point 702 of the wall surface 701 in FIG. 7.

FIG. 10 is a flowchart showing processing of correcting and projecting the second projection region according to the first embodiment. This processing concerns processing when the user projects again an image on a wall surface on which he projected an image in the past. For example, this processing is equivalent to processing of, after storing the first projection state described with reference to FIG. 2, temporarily dismantling the projector and then installing it again. This processing will be explained according to the flowchart together with an example in FIG. 11.

Figure 11:
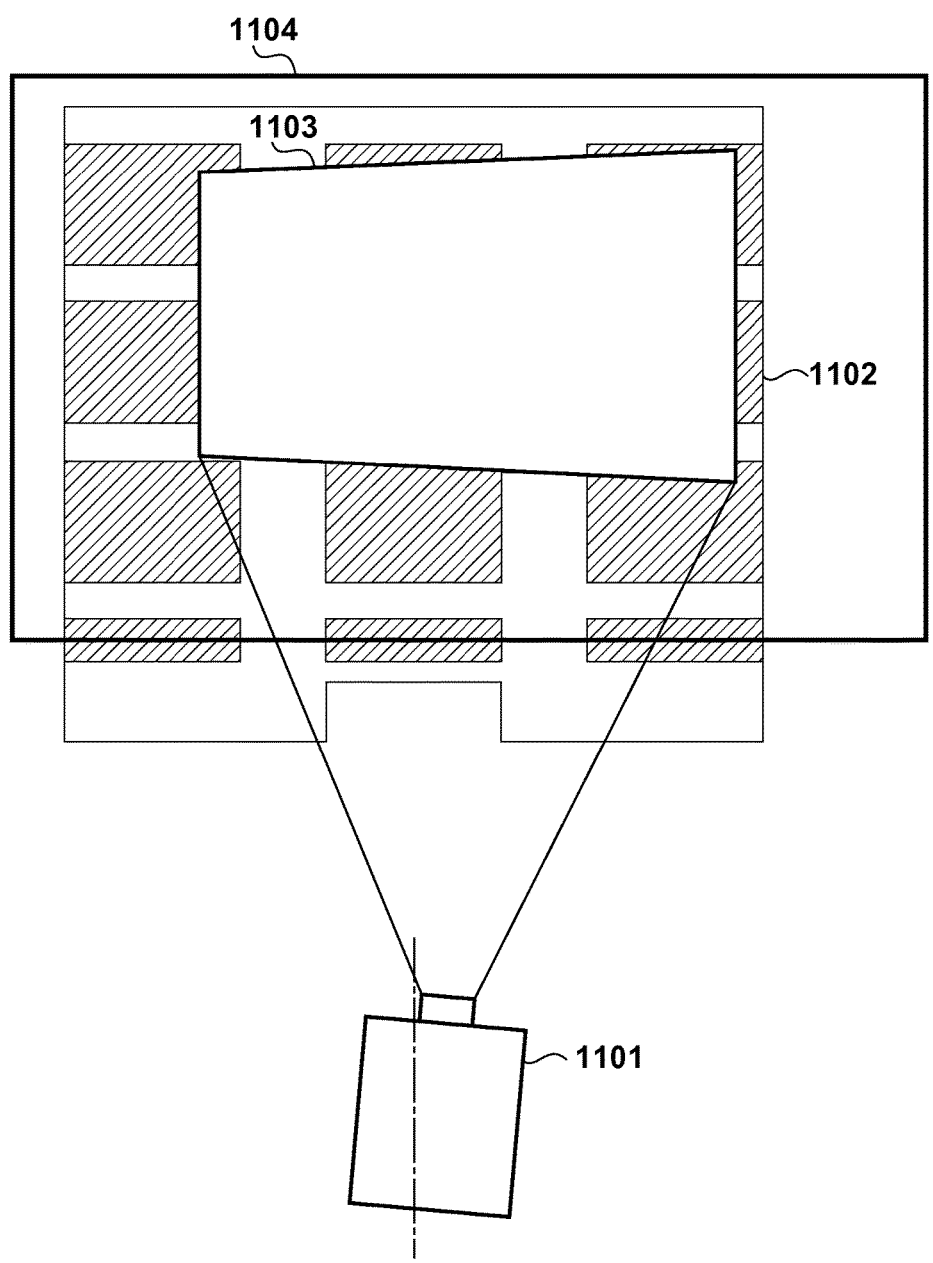
FIG. 11 is a view showing an example of the second projection state according to the first embodiment.

In step S1001, the user installs again the projector, and projects again an image by using the projection unit 101. This state will be referred to as the second projection state. FIG. 11 shows an example of the second projection state. The user installs a projector 1101 so that the projection state becomes the same as the first projection state. However, manual installation has limitations on the adjustment of the installation position and installation angle. As a result, the position and shape of a projection region 1103 projected on a wall surface 1102 become different from those of the projection region 303 projected in step S201.

In step S1002, the projection unit 101 accepts a user operation serving as a trigger to advance the process to step S1003 and subsequent steps. The user operation is accepted through, for example, an operation to an input unit such as the button of the projector or a remote control accessory to the projector. However, the embodiment does not limit these input units. It is also possible to omit step S1002 by automatically generating a notification equivalent to the user operation within the projector. The method of automatically generating a notification within the projector is, for example, a method of synchronizing with state transition of the projector a predetermined time after the start of projection.

In step S1003, the acquisition unit 102 captures the wall surface on which the projection unit 101 has projected an image, and acquires the captured projection surface as the second projection surface information. In the example of FIG. 11, a region 1104 is captured, and the captured projection surface is acquired as the second projection surface information. The second projection surface information corresponds to the second image obtained by capturing, from a position corresponding to the second position, the projection surface on which the target image has been projected.

In step S1004, the detection unit 103 normalizes the second projection surface information by using the basic projection surface information, thereby obtaining the normalized second projection surface information. Details of this processing will be described later with reference to FIG. 12.

In step S1005, the decision unit 105 decides a projection correction parameter. Details of this processing will be described later with reference to FIG. 15.

In step S1006, the control unit 106 controls to reflect the projection correction parameter in the target image and project the target image. The reflection form of the projection correction parameter assumes various forms synchronized with projector functions, such as deformation, offset, scaling, and optical correction of an electrical image.

Figure 12:
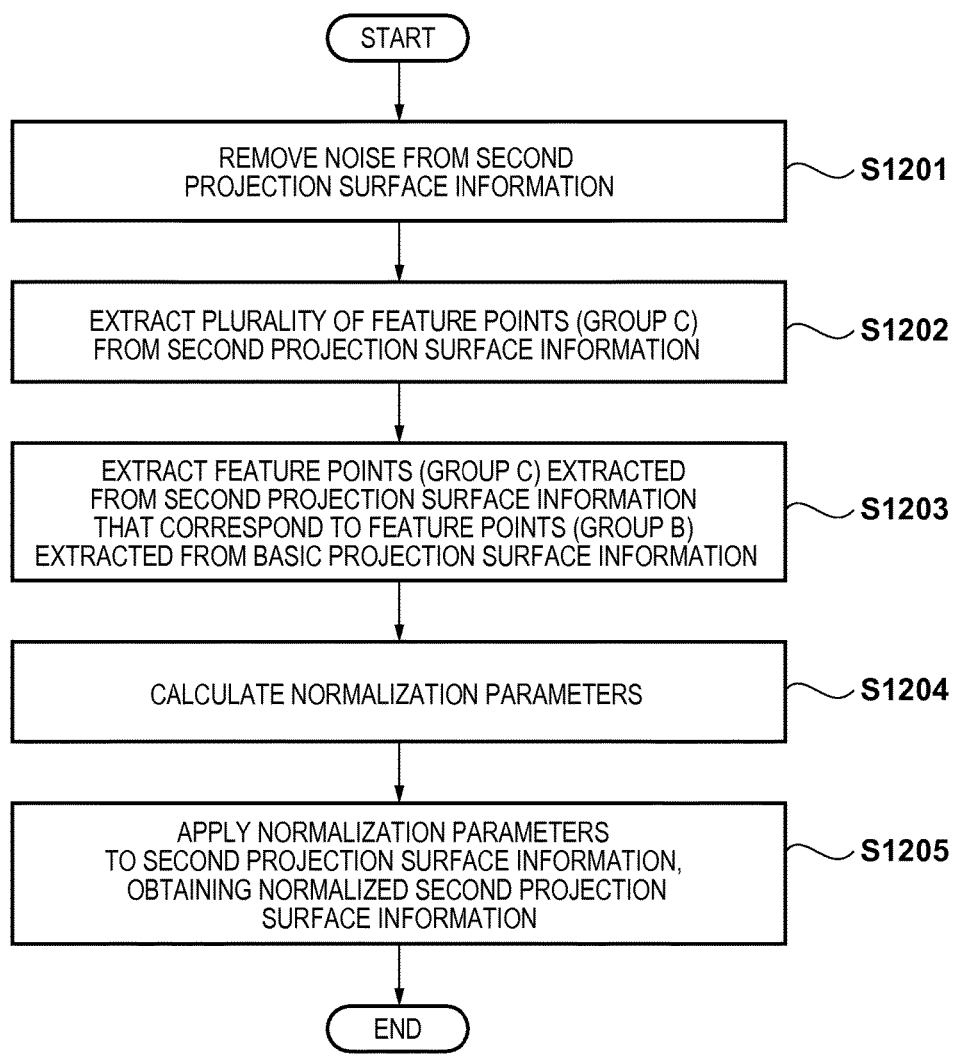
FIG. 12 is a flowchart showing details of processing of normalizing the second projection surface information to obtain the normalized second projection surface information according to the first embodiment.

FIG. 12 is a flowchart showing details of the processing of normalizing the second projection surface information by using the basic projection surface information, thereby obtaining the normalized second projection surface information according to the first embodiment. This processing corresponds to step S1004 of FIG. 10. The normalized second projection surface information is the third image corrected so that the position of the feature point of the projection surface in the second projection surface information corresponds to the position of the feature point of the projection surface in the first projection surface information. This processing will be explained according to the flowchart together with an example in FIGS. 13 and 14.

In step S1201, the detection unit 103 removes noise from the second projection surface information. Details of this processing are the same as those of step S501. An algorithm to be applied can be the same as the algorithm applied to the first projection surface information and basic projection surface information.

Figure 13:
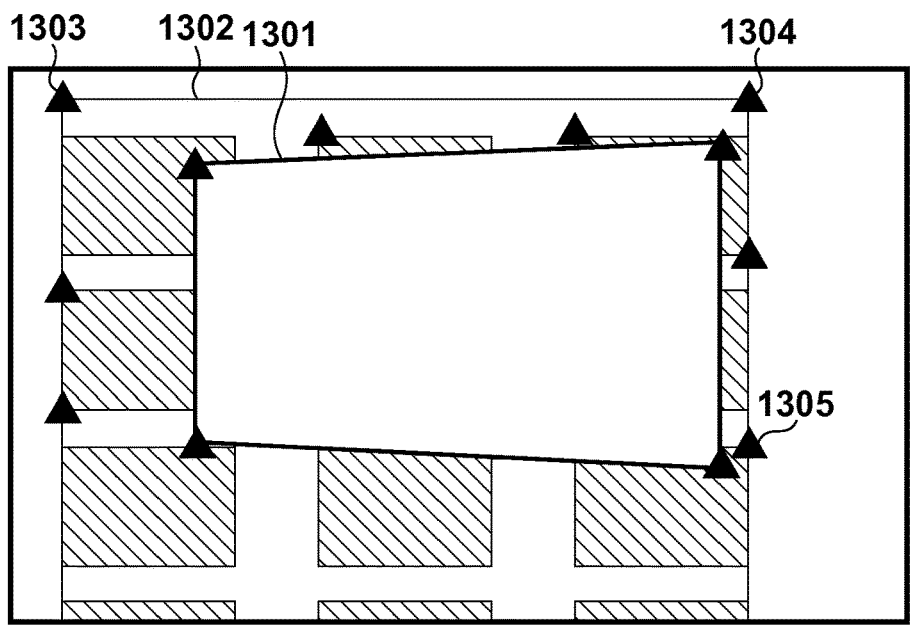
FIG. 13 is a view showing an example of the detection result of a feature point group in the second projection surface information according to the first embodiment.

In step S1202, the detection unit 103 detects a plurality of feature points (group C) from the second projection surface information. Details of this processing are the same as those in steps S502 and S503, and an algorithm to be applied is also the same. FIG. 13 shows an example of the result of detecting the feature point group of the wall surface in the second projection surface information. The second projection surface information is acquired in step S1003, and is equivalent to the region 1104 shown in FIG. 11. In FIG. 13, reference numeral 1301 denotes a projection region; and 1302, a wall surface. Feature points surrounding the projection region 1301 and wall surface 1302 are detected.

In step S1203, the detection unit 103 detects three or more feature points (group C) which have been detected from the second projection surface information and correspond to the feature points (group B) detected from the basic projection surface information. As the method of detecting corresponding feature points from feature points (group B) and feature points (group C), for example, a KLT method is used. However, the embodiment does not limit the detection algorithm. The following description continues on the assumption that, in the example of FIG. 13, feature points 1303 to 1305 detected from the second projection surface information have been detected in correspondence with the feature points 702, 705, and 709 detected from the basic projection surface information, respectively.

In step S1204, the detection unit 103 decides normalization parameters for converting the second projection surface information into an image captured from the same position as that of the basic projection surface information. The normalization parameters are obtained by substituting, into an affine matrix in equation (2), the coordinates of three pairs of feature points detected in step S1203:

$$\begin{pmatrix} x' \\ y' \\ 1 \end{pmatrix} = \begin{bmatrix} a & b & t_x \\ c & d & t_y \\ 0 & 0 & 1 \end{bmatrix} \begin{pmatrix} x \\ y \\ 1 \end{pmatrix} \quad (2)$$

where x and y are the coordinates of a feature point detected from the basic projection surface information, and x' and y' are the coordinates of a feature point detected from the second projection surface information. a, b, c, and d calculated by solving simultaneous equations are scaling/rotation parameters, and $t_x$ and $t_y$ are translation parameters. These parameters will be generically called normalization parameters.

Figure 14:
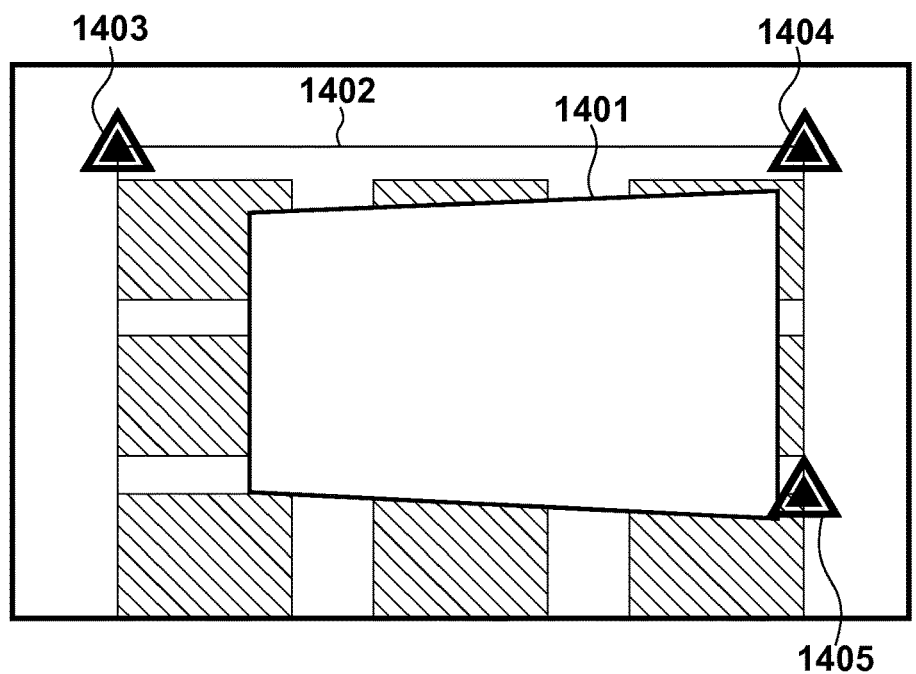
FIG. 14 is a view showing an example of the normalized second projection surface information according to the first embodiment.

In step S1205, the detection unit 103 applies the normalization parameters decided in step S1204 to the pixels of the entire projection surface represented by the second projection surface information, thereby obtaining the normalized second projection surface information. FIG. 14 shows an example of the normalized second projection surface information. In FIG. 14, reference numeral 1401 denotes a normalized projection region; and 1402, a normalized wall surface. Plots 1403 to 1405 are obtained by normalizing the feature points 1303 to 1305 detected in step S1203, respectively. As a result, the coordinates of the plots 1403, 1404, and 1405 coincide with those of the feature points 702, 705, and 709 detected from the basic projection surface information.

Figure 15:
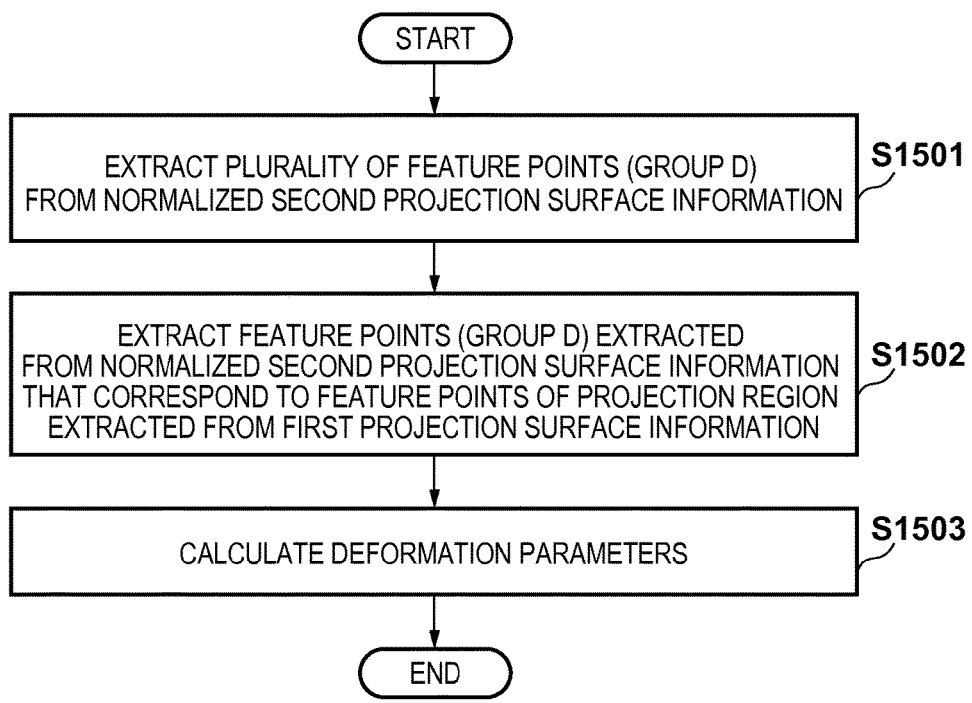
FIG. 15 is a flowchart showing details of processing of deciding a projection correction parameter according to the first embodiment.

FIG. 15 is a flowchart showing details of the processing of deciding a projection correction parameter according to the first embodiment. This processing corresponds to step S1005 of FIG. 10. This processing will be explained according to the flowchart together with an example in FIGS. 16 and 17.

Figure 16:
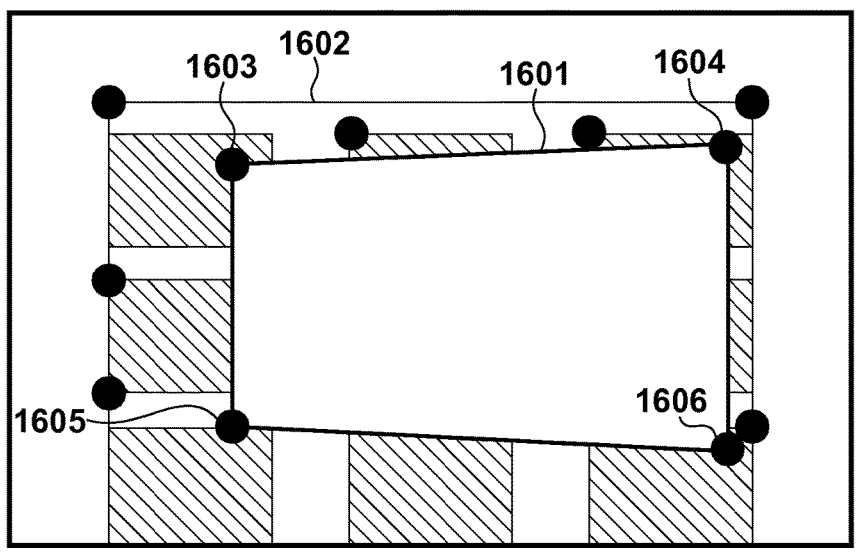
FIG. 16 is a view showing an example of the detection result of a feature point group in the normalized second projection surface information according to the first embodiment.

In step S1501, the detection unit 103 detects a plurality of feature points (group D) from the normalized second projection surface information. Details of this processing are the same as steps S502, S503, and S1202, and an algorithm to be applied is the same. FIG. 16 shows an example of the detection result of the feature point group of the wall surface in the normalized second projection surface information. In FIG. 16, reference numeral 1601 denotes a projection region; and 1602, a wall surface. Feature points surrounding the projection region 1601 and wall surface 1602 are detected.

In step S1502, the detection unit 103 detects feature points (group D) which have been detected from the normalized second projection surface information and correspond to the feature points of the projection region detected from the first projection surface information. The feature points of the projection region have been detected in step S504 and stored in the form of the table 800. As a result of detecting feature points corresponding to the feature points of the projection region, feature points 1603 to 1606 in FIG. 16 are detected.

In step S1503, the decision unit 105 decides deformation parameters for deforming the projection region in the normalized second projection surface information into the projection region in the first projection surface information. The deformation parameters are calculated by substituting, into the affine matrix in equation (2), the coordinates of three pairs of feature points among the feature points detected in step S1502. In equation (2), x and y are the coordinates of the feature point of the projection region that has been detected from the normalized second projection surface information, and x' and y' are the coordinates of the feature point of the projection region that has been detected from the first projection surface information. a, b, c, and d calculated by solving simultaneous equations are scaling/rotation parameters, and $t_x$ and $t_y$ are translation parameters. These parameters will be generically called deformation parameters.

FIG. 17 is a schematic view showing a projection state reflecting the projection correction parameter obtained as the result of processing in step S1006. In FIG. 17, a projector 1701 is moved from the position (central axis) of the projector 301 in the first projection state. However, the position of a projection region 1703 with respect to a wall surface 1702 is the same as the position of the projection region 303 with respect to the wall surface 302 in the first projection state. In this manner, the decision unit 105 decides the projection correction parameter which reduces or cancels the difference between the position of a feature point indicated by projection region information detected by the detection unit 103, and that of a feature point indicated by projection region information already stored in the storage unit 104. Hence, the target image can be corrected so that the position of the target image in the first image corresponds to that of the target image in the third image. When projecting the target image from the second position, the target image corrected by the projection unit 101 is projected on the projection surface.

Accordingly, the projection region can be automatically corrected (controlled) in the second and subsequent projection operations to project a target image.

According to the first embodiment, in step S204, the capturing apparatus captures a wall surface to acquire basic projection surface information in a state in which projection is temporarily stopped. Then, in step S205, the feature points of the projection region and wall surface are detected from the first projection surface information and basic projection surface information. However, the present invention is not limited to this. For example, in step S204, the capturing apparatus may capture a wall surface to acquire basic projection surface information in a state in which an image different from one at the time of acquiring the first projection surface information is projected. Then, in step S205, the feature points of the projection region and wall surface may be detected from the first projection surface information and basic projection surface information.

As described above, according to the first embodiment, information representing the positional relationship between a projection region and a wall surface serving as a projection destination is stored at the time of the first projection operation. The projection region at the time of the second and subsequent projection operations is corrected using this information. On an arbitrary projection surface, a target image from the projector can be easily projected in the same state as the past projection state. In addition, the projector is easily installed.

<Second Embodiment>

The second embodiment will be described mainly for a difference from the first embodiment. However, the technical scope of the present invention is not limited to this embodiment.

The second embodiment assumes a case in which processing of storing the first projection region information shown in FIG. 2 is executed independently a plurality of times. For example, an image is projected on a plurality of different wall surfaces by using a projector, and pieces of first projection region information are stored for the respective scenes. In this case, a detection unit 103 stores the feature point groups of the respective wall surfaces, the feature point groups of the respective projection regions, and pieces of basic projection surface information.

Figure 18:
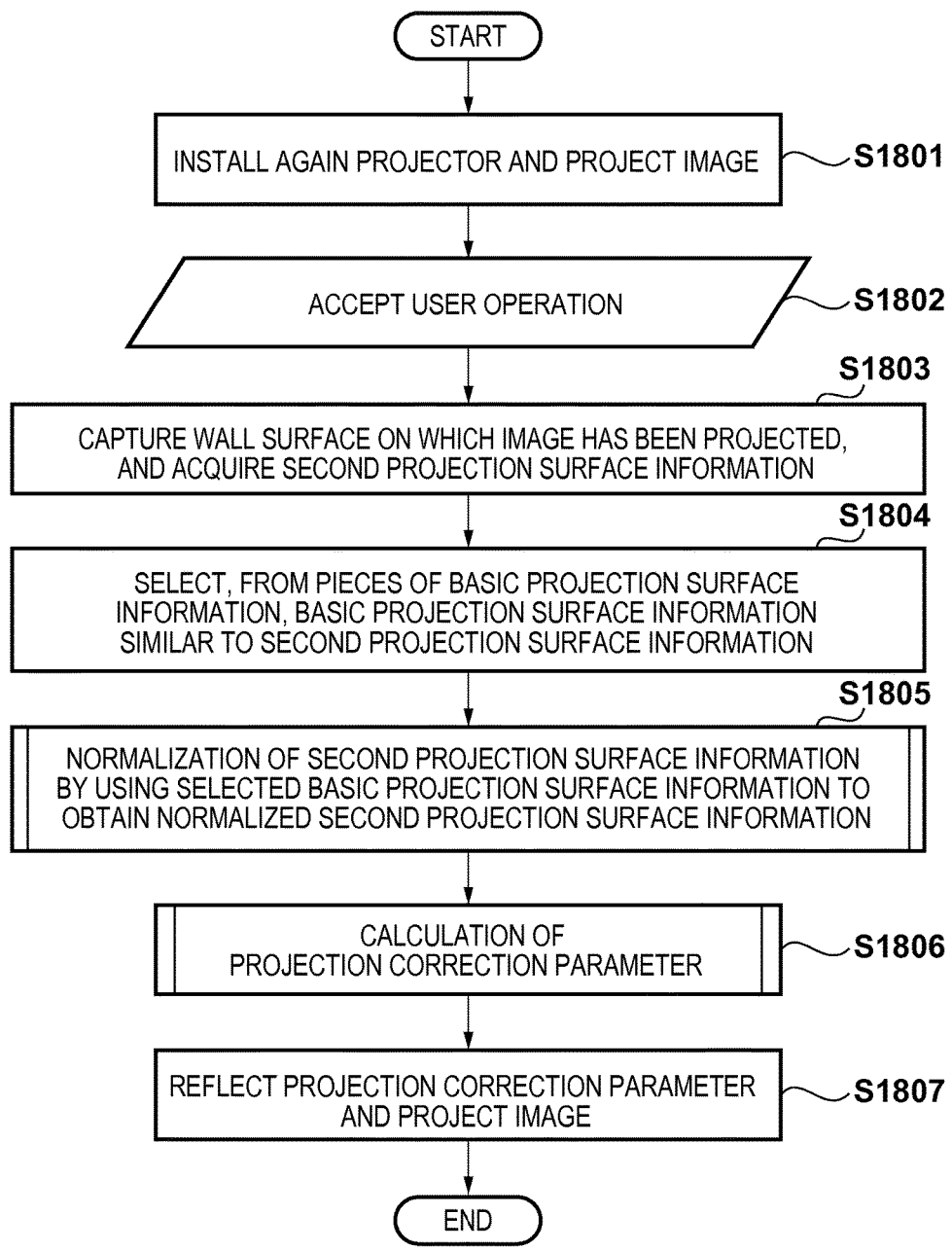
FIG. 18 is a flowchart showing processing of correcting and projecting the second projection region according to the second embodiment.

FIG. 18 is a flowchart showing processing of correcting and projecting the second projection region according to the second embodiment. The second embodiment assumes that a storage unit 104 stores the first information (first basic projection surface information) indicating the position, on the projection surface, of a target image projected on the projection surface from the first position by a projection unit 101. Also, assume that the storage unit 104 stores the second information (second basic projection surface information) indicating the position, on the projection surface, of the target image projected on the projection surface from the third position different from the first position by the projection unit 101.

In step S1801, the projector is installed again, and then the projection unit 101 projects again an image. This state will be referred to as the second projection state.

In step S1802, the projection unit 101 accepts a user operation serving as a trigger to advance the process to step S1803 and subsequent steps.

In step S1803, an acquisition unit 102 captures the wall surface on which the image has been projected, and acquires the captured projection surface as the second projection surface information.

In step S1804, the detection unit 103 selects basic projection surface information similar to the second projection surface information from pieces of basic projection surface information stored in the storage unit 104. As the method of selecting similar basic projection surface information, it may be selected in accordance with a selection instruction from the user. Alternatively, basic projection surface information having a higher degree of similarity with the second projection surface information than other pieces of basic projection surface information may be selected using a well-known algorithm such as a genetic algorithm.

In step S1805, the detection unit 103 normalizes the second projection surface information by using the selected basic projection surface information, thereby obtaining the normalized second projection surface information.

In step S1806, a decision unit 105 decides a projection correction parameter.

In step S1807, a control unit 106 controls to reflect the projection correction parameter in the target image and project the target image. The reflection form of the projection correction parameter assumes various forms synchronized with projector functions, such as deformation, offset, scaling, and optical correction of an electrical image.

As described above, according to the second embodiment, while basic projection surface information similar to the second projection surface information is selected from pieces of basic projection surface information, the projection region can be automatically corrected (controlled) in the second and subsequent projection operations to project an image, in addition to the effects described in the first embodiment.

For example, when the second information is selected in step S1804, the control unit 106 controls the projection unit 101 based on the second information, information acquired at a position corresponding to the first position by the acquisition unit, and information acquired at the third position by the acquisition unit. The control unit 106 controls the projection unit 101 so that the position, on the projection surface, of a target image to be projected from the third position becomes a position corresponding to the first information.

<Third Embodiment>

In the above-described embodiments, projection mapping has been exemplified and explained. The third embodiment is effective even in another use form in a meeting room, a home theater, or the like.

Embodiment(s) of the present invention can also be realized by a computer of a system or apparatus that reads out and executes computer executable instructions (e.g., one or more programs) recorded on a storage medium (which may also be referred to more fully as a "non-transitory computer-readable storage medium") to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

For example, even when an acquisition unit is arranged on a commercially available camera (external apparatus), the embodiment becomes effective by connecting the acquisition unit via a communication unit to a detection unit arranged on a projector.

According to the above-described embodiments, a target image from the projection apparatus can be easily projected on an arbitrary projection surface in the same state as a past projection state. Also, according to the above-described embodiments, the projection apparatus can be easily installed.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-200525, filed Sep. 26, 2013, which is hereby incorporated by reference herein in its entirety.

What is claimed is:

1. An information processing apparatus comprising:
at least one processor; and
a memory having stored thereon instructions which, when executed by the at least one processor, causes the information processing apparatus to:
acquire, based on a first captured image obtained by capturing a projection surface in response to a first predetermined operation by a user, first information for specifying a positional relationship between a first projection position of an image projected by a projector at a first point of time when the first captured image is obtained and a specific position on the projection surface, wherein the specific position on the projection surface is independent from an image projected by the projector;

store the acquired first information in a storage unit;

acquire, based on a second captured image obtained by capturing the projection surface in response to a second predetermined operation by a user, second information for specifying a positional relationship between a second projection position of an image projected by the projector at a second point of time when the second captured image is obtained and the specific position on the projection surface; and control the projector based on the stored first information and the acquired second information so that a positional relationship between a position of an image projected by the projector and the specific position on the projection surface approaches from the positional relationship between the specific position on the projection surface and the second projection position at the second point of time when the second captured image is captured in response to the second predetermined operation to the positional relationship between the specific position on the projection surface and the first projection position at the first point of time when the first captured image is obtained in response to the first predetermined operation, wherein the first point of time is earlier than the second point of time.

2. The information processing apparatus according to claim 1, wherein the first information is acquired by capturing the projection surface from a first capturing position corresponding to a position of the projector in a first state at the first point of time, and wherein the second information is acquired by capturing the projection surface from a second capturing position corresponding to a position of the projector in a second state at the second point of time.

3. The information processing apparatus according to claim 2, wherein the execution of the instructions by the at least one processor further causes the information processing apparatus to:

acquire a third capture image obtained by capturing, from the first capturing position, the projection surface where no image is being projected by the projector, generate a normalized second captured image by correcting the second captured image to make a position of a feature point in the second captured image correspond to a position of a feature point in the third captured image, correct a projection image to make a position of the projection image in the normalized second captured image correspond to a position of a projection image in the first captured image, and control, when projecting the projection image in the second state, the projector to project the corrected projection image on the projection surface.

4. The information processing apparatus according to claim 1, wherein the execution of the instructions by the at least one processor further causes the information processing apparatus to:

detect feature points from a captured image obtained by capturing the projection surface, wherein the acquired first information indicates a plurality of feature points detected from the first captured image, the plurality of feature points comprising a feature point corresponding to the specific position on the projection surface and a feature point corresponding to a specific position of the image projected by the projector.

5. The information processing apparatus according to claim 4, wherein the plurality of feature points comprises feature points corresponding to specific positions on the projection surface which are positioned outside a projection region where the image is projected by the projector.

6. The information processing apparatus according to claim 1, wherein the execution of the instructions by the at least one processor further causes the information processing apparatus to:

store a plurality of the first information corresponding to a plurality of different projection surfaces that are acquired based on a plurality of images captured at a plurality of points of time, select one of the plurality of the stored first information, and control the projector based on the selected first information and the acquired second information so that a positional relationship between a position of an image projected by the projector and the specific position on the projection surface approaches from the positional relationship between the specific position on the projection surface and the second projection position at the second point of time to the positional relationship between the specific position on the projection surface and the first projection position at the first point of time when the first captured image corresponding to the selected first information is obtained.

7. The information processing apparatus according to claim 6, wherein the one of the plurality of the stored first information is selected based on an instruction from a user.

8. The information processing apparatus according to claim 1, wherein the execution of the instructions by the at least one processor further causes the information processing apparatus to control the projector so that at least one of a shape, size, and keystone of an image projected by the projector matches the stored first information.

9. The information processing apparatus according to claim 1, wherein the first information is acquired based on both the first captured image obtained by capturing the projection surface where the image is being projected by the projector and a third captured image obtained by capturing the projection surface where no image is being projected by the projector.

10. The information processing apparatus according to claim 1, wherein:

the first information is acquired based on the first captured image obtained by capturing the projection surface where an image is being projected by the projector in a first state, the second information is acquired based on the second captured image obtained by capturing the projection surface where an image is being projected by the projector in a second state different from the first state, and the projector is controlled so that a position of an image projected by the projector in the second state approaches from the second projection position to the first projection position where an image had been projected in the past by the projector in the first state.

11. The information processing apparatus according to claim 10, wherein at least one of a position and a direction of the projector is different between the first state and the second state.

12. The information processing apparatus according to claim 1, wherein the projector is controlled to modify an image to be projected according to a parameter determined based on the stored first information and the acquired second information, so that a position of an image projected by the projector becomes the same as the first projection position where an image had been projected in the past by the projector.

13. A method of controlling an information processing apparatus, comprising:

acquiring, based on a first captured image obtained by capturing a projection surface in response to a first predetermined operation by a user, first information for specifying a positional relationship between a first projection position of an image projected by a projector at a first point of time when the first captured image is obtained and a specific position on the projection surface, wherein the specific position on the projection surface is independent from an image projected by the projector;

storing the acquired first information in a storage unit;

acquiring, based on a second captured image obtained by capturing the projection surface in response to a second predetermined operation by a user, second information for specifying a positional relationship between a second projection position of an image projected by the projector at a second point of time when the second captured image is obtained and the specific position on the projection surface; and controlling the projector based on the stored first information and the acquired second information so that a positional relationship between a position of an image projected by the projector and the specific position on the projection surface approaches from the positional relationship between the specific position on the projection surface and the second projection position at the second point of time when the second captured image is obtained in response to the second predetermined operation to the positional relationship between the specific position on the projection surface and the first projection position at the first point of time when the first captured image is obtained in response to the first predetermined operation, wherein the first point of time is earlier than the second point of time.

14. The method according to claim 13, wherein:

the first information is acquired by capturing the projection surface from a first capturing position corresponding to a position of the projector in a first state at the first point of time, and the second information is acquired by capturing the projection surface from a second capturing position corresponding to a position of the projector in a second state at the second point of time.

15. A non-transitory computer-readable storage medium having recorded therein a program for causing a computer to:

acquire, based on a first captured image obtained by capturing a projection surface in response to a first predetermined operation by a user, first information for specifying a positional relationship between a first projection position of an image projected by a projector at a first point of time when the first captured image is obtained and a specific position on the projection surface, wherein the specific position on the projection surface is independent from an image projected by the projector;

store the acquired first information in a storage unit;

acquire, based on a second captured image obtained by capturing the projection surface in response to a second predetermined operation by a user, second information for specifying a positional relationship between a second projection position of an image projected by the projector at a second point of time when the second captured image is obtained and the specific position on the projection surface; and control the projector based on the stored first information and the acquired second information so that a positional relationship between a position of an image projected by the projector and the specific position on the projection surface approaches from the positional relationship between the specific position on the projection surface and the second projection position at the second point of time when the second captured image is obtained in response to the second predetermined operation to the positional relationship between the specific position on the projection surface and the first projection position at the first point of time when the first captured image is obtained in response to the first predetermined operation, wherein the first point of time is earlier than the second point of time.

16. The non-transitory computer-readable storage medium according to claim 15, wherein the first information is acquired by capturing the projection surface from a first capturing position corresponding to a position of the projector in a first state at the first point of time, and wherein the second information is acquired by capturing the projection surface from a second capturing position corresponding to a position of the projector in a second state at the second point of time.

* * * * *